United States Patent [19]
Price

[11] 3,984,975
[45] Oct. 12, 1976

[54] INTERNAL COMBUSTION ENGINE EXHAUST EMISSION CONTROL

[75] Inventor: Robert T. Price, Rochester, Mich.
[73] Assignee: General Motors Corporation, Detroit, Mich.
[22] Filed: Nov. 10, 1975
[21] Appl. No.: 630,197

[52] U.S. Cl. ................................. 60/274; 60/284; 60/301
[51] Int. Cl.² ......................................... F02B 75/10
[58] Field of Search ............ 60/274, 284, 288, 301, 60/286, 287

[56] References Cited
UNITED STATES PATENTS

| | | | |
|---|---|---|---|
| 1,761,960 | 6/1930 | Armitage | 60/323 |
| 3,744,248 | 7/1973 | Foster | 60/286 |
| 3,767,764 | 10/1973 | Dolbear | 60/274 |
| 3,791,143 | 2/1974 | Keith | 60/274 |
| 3,824,788 | 7/1974 | Cole | 60/274 |

*Primary Examiner*—Douglas Hart
*Attorney, Agent, or Firm*—C. K. Veenstra

[57] ABSTRACT

A V-type internal combustion engine has left and right exhaust manifolds interconnected by an exhaust crossover passage and connected by left and right exhaust pipes respectively to a main catalytic converter. The left exhaust pipe has an auxiliary catalytic converter, while the right exhaust pipe has a valve which is closed during engine warm-up. The valve diverts exhaust gases from the right exhaust manifold through the crossover passage to the left exhaust manifold for flow through the auxiliary converter and the left exhaust pipe to the main converter during warm-up and permits exhaust gases to flow directly from the right exhaust manifold to the main converter during normal operation. A pump delivers air into the right exhaust manifold for delivery through the auxiliary converter to the main converter during engine warm-up and for delivery directly to the main converter during normal operation, thus limiting oxidation in the auxiliary converter.

3 Claims, 1 Drawing Figure

U.S. Patent   Oct. 12, 1976   3,984,975
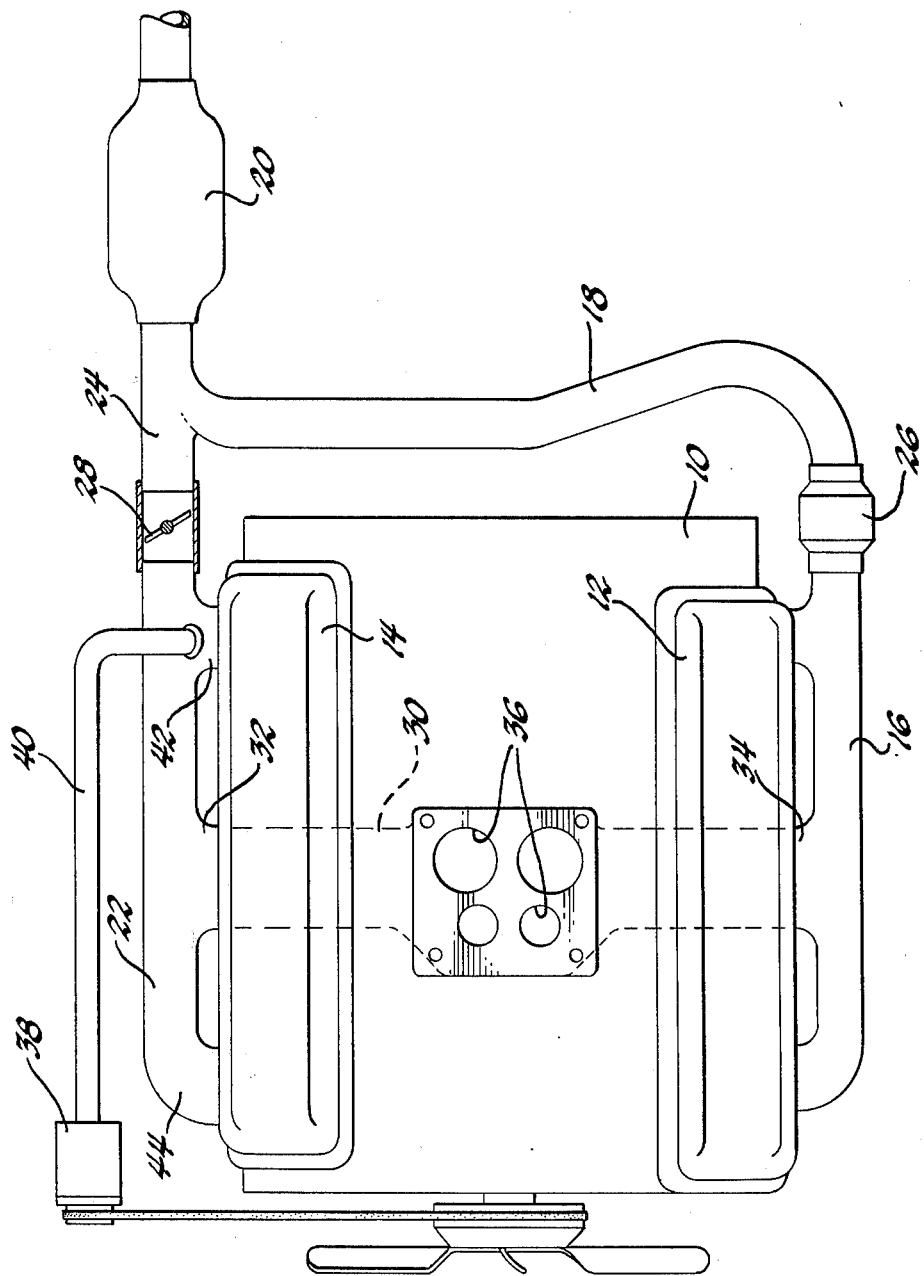

INTERNAL COMBUSTION ENGINE EXHAUST EMISSION CONTROL

This invention relates to control of exhaust emissions from internal combustion engines.

The catalytic converter has been recognized and adopted as an effective device for oxidizing and thereby controlling the emission of exhaust gas hydrocarbons and carbon monoxide. Various exhaust system configurations involving use of single and multiple catalytic converters have been proposed for V-type internal combustion engines. In one such proposal, the left and right exhaust manifolds are connected by left and right exhaust pipes respectively to a single main catalytic converter: during engine warm-up, a valve in one of the exhaust pipes diverts exhaust gases from its associated manifold through a crossover passage to the other manifold for flow through the other exhaust pipe and eventual oxidation in the main converter while an auxiliary catalytic converter in the other exhaust pipe initiates early oxidation; during normal operation, the valve is open to allow exhaust gases to flow from each manifold directly to the main converter. The auxiliary converter thus receives all of the exhaust gases during engine warm-up, and receives only half of the exhaust gases during normal operation. The auxiliary converter is accordingly preserved against rapid deterioration.

In some applications, however, additional air must be mixed with the exhaust gases to provide the most effective oxidation reaction. In such applications, it has been discovered that the auxiliary converter may deteriorate rapidly if additional air is mixed with the exhaust gases it receives during normal operation.

The usual method for mixing air with exhaust gases has been to deliver the air to the engine exhaust ports near the inlet legs of the exhaust manifolds. However, it has been found that exhaust gases and air may be adequately mixed for oxidation in a catalytic converter by delivering the air to a single point in the exhaust manifold or exhaust pipe ahead of the converter, U.S. Pat. No. 3,662,540 illustrating one example of that approach.

This invention utilizes the advantages of the single point air delivery approach to control exhaust emissions in a V-type internal combustion engine having main and auxiliary converters, as in the proposal described above, in a manner which preserves the auxiliary converter against rapid deterioration. In this invention, air is delivered to one — or if desired several — locations in the exhaust manifold associated with the control valve so that, when the control valve is closed during engine warm-up, air is delivered with the exhaust gases flowing through the auxiliary converter to the main converter and, when the control valve is open for normal operation, air is delivered with the exhaust gases flowing directly to the main converter without passing through the auxiliary converter. Accordingly, oxidation in the auxiliary converter is limited during normal operation to preclude rapid deterioration of the auxiliary converter.

The details as well as other features and advantages of this invention are set forth in the following detailed description of the invention and in the drawing which schematically shows a top plan view of an engine employing this invention.

Referring to the drawing, an internal combustion engine 10 has combustion chambers arranged in left- and right-hand banks 12 and 14. A left-hand exhaust manifold or plenum 16 receives exhaust gases from left bank 12 and has an exhaust pipe 18 which provides a passage to a main catalytic converter 20. A right-hand exhaust manifold or plenum 22 receives exhaust gases from right bank 14 and has an exhaust pipe 24 which provides a passage to main converter 20.

An auxiliary catalytic converter 26 is disposed in left exhaust pipe 18, and a control valve 28 is disposed in right exhaust pipe 24.

An exhaust crossover passage 30 extends from the middle leg 32 of right exhaust manifold 22 to the middle leg 34 of left exhaust manifold 16. Crossover passage 30 extends beneath and in heat-exchange relation with the induction passage bores 36 to heat the air-fuel mixture passing therethrough.

An engine driven air pump 38 delivers additional air through a pipe 40 to another leg 42 of right exhaust manifold 22. It is emphasized that pump 38 does not deliver air directly to left exhaust manifold 16. In addition, it seems preferable that air pump 38 not deliver air directly to the middle leg 32 of right exhaust manifold 22 (the leg which is connected directly to crossover passage 30), although air may be delivered to the forward leg 44 of right exhaust manifold 22 if such seems desirable.

In operation, control valve 28 is closed during engine warm-up and exhaust gases received in right exhaust manifold 22, together with the additional air received through pipe 40, are directed through crossover passage 30 into left exhaust manifold 16. All the exhaust gases and the air then flow though auxiliary catalytic converter 26, which initiates oxidation of exhaust gas hydrocarbons and carbon monoxide, and on through exhaust pipe 18 to main converter 20, which promotes further oxidation.

Control valve 28 is open during normal operation to permit exhaust gases received in right exhaust manifold 22, together with the additional air received through pipe 40, to pass directly through right exhaust pipe 24 to main converter 20 while exhaust gases received in left exhaust manifold 16 pass through auxiliary converter 26 and left exhaust pipe 18 to main converter 20. The absence of substantial additional air in the exhaust gases passing through auxiliary converter 26 limits oxidation in auxiliary converter 26 and thus preserves auxiliary converter 26 against rapid deterioration.

The embodiments of the invention in which an exclusive property or privilege is claimed are defined as follows:

1. The method of controlling exhaust emissions from an internal combustion engine having first and second exhaust plenums receiving exhaust gases from the engine, a crossover passage interconnecting said plenums, a main converter for promotion oxidation of exhaust gases, first and second exhaust passages respectively connecting said first and second exhaust plenums to said main converter, and an auxiliary converter in said first exhaust passage for promoting oxidation of exhaust gases, said method comprising the steps of:

delivering additional air into said second exhaust plenum but not directly into said first exhaust plenum, and during one mode of operation obstructing flow through said second exhaust passage to direct the exhaust gases and air from said second exhaust plenum through said crossover passage to said first exhaust plenum and from said first exhaust plenum through said first exhaust passage and said auxiliary converter to said main converter whereby the exhaust gases received in both said first and second exhaust plenums are mixed with the additional air and oxidized in both said auxiliary and main converters, and during another mode of operation permitting flow from said first and second exhaust plenums through said first and second exhaust passages respectively directly to said main converter whereby the exhaust gases received in said first exhaust plenum are oxidized in said auxiliary converter substantially without the additional air to limit oxidation in said auxiliary converter and whereby the exhaust gases received in both said first and second exhaust plenums are mixed with the additional air and oxidized in said main converter.

2. An internal combustion engine exhaust emission control system comprising first and second exhaust plenums for receiving exhaust gases from the engine, a crossover passage extending from said second exhaust plenum to said first exhaust plenum, a main converter adapted to promote oxidation of exhaust gases, a first exhaust passage extending from said first exhaust plenum to said main converter, an auxiliary converter in said first exhaust passage for promoting oxidation of exhaust gases, a second exhaust passage extending from said second exhaust plenum to said main converter, valve means in said second exhaust passage for directing exhaust gases to flow from said second exhaust plenum through said crossover passage to said first exhaust plenum and from said first exhaust plenum through said first exhaust passage and said auxiliary converter to said main converter when said valve means is closed and permitting exhaust gases to flow from said first and second exhaust plenums through said first and second exhaust passages respectively directly to said main converter when said valve means is open, and an air delivery conduit extending to said second exhaust plenum but not to said first exhaust plenum for delivering additional air to said second exhaust plenum which flows through said crossover passage, said first exhaust plenum, said first exhaust passage and said auxiliary converter to said main converter to support oxidation of exhaust gases in both said auxiliary and main converters when said valve means is closed and substantially all of which flows through said second exhaust passage directly to said main converter to support oxidation of exhaust gases in said main converter and limit oxidation of exhaust gases in said auxiliary converter when said valve means is open.

3. An internal combustion engine exhaust emission control system comprising first and second exhaust plenums each having a plurality of legs for receiving exhaust gases from the engine, a crossover passage extending from one leg of said second exhaust plenum to one leg of said first exhaust plenum, an induction passage disposed in heat exchange relation with said crossover passage, a main catalytic converter for promoting oxidation of exhaust gases, a first exhaust passage extending from said first exhaust plenum to said main converter, an auxiliary catalytic converter in said first exhaust passage for promoting oxidation of exhaust gases, a second exhaust passage extending from said second exhaust plenum to said main converter, a valve in said second exhaust passage for directing exhaust gases to flow from said second exhaust plenum through said crossover passage to said first exhaust plenum and from said first exhaust plenum through said first exhaust passage and said auxiliary converter to said main converter during initial operation and permitting exhaust gases to flow from said first and second exhaust plenums through said first and second exhaust passages respectively directly to said main converter during subsequent operation, and an air delivery conduit extending to another leg of said second exhaust plenum but not to said one leg of said exhaust plenum and not to said first exhaust plenum for delivering air to said second exhaust plenum which flows through said crossover passage, said first exhaust plenum, said first exhaust passage and said auxiliary converter to said main converter to support oxidation of exhaust gases in said main and auxiliary converters during initial operation and substantially all of which flows through said second exhaust passage directly to said main converter to support oxidation of exhaust gases in said main converter and limit oxidation of exhaust gases in said auxiliary converter during subsequent operation.

* * * * *